(12) United States Patent
Luca et al.

(10) Patent No.: US 8,488,937 B2
(45) Date of Patent: Jul. 16, 2013

(54) LIGHT DISTRIBUTION ASSEMBLY

(75) Inventors: Dragos N. Luca, Toronto (CA); Zoran Krnetic, Mississauga (CA)

(73) Assignee: Tyco Electronics Canada, ULC, Markham, Ontario (CA)

( * ) Notice: Subject to any disclaimer, the term of this patent is extended or adjusted under 35 U.S.C. 154(b) by 365 days.

(21) Appl. No.: 12/849,368

(22) Filed: Aug. 3, 2010

(65) Prior Publication Data

US 2011/0032726 A1 Feb. 10, 2011

Related U.S. Application Data

(60) Provisional application No. 61/273,621, filed on Aug. 6, 2009.

(51) Int. Cl.
*G02B 6/10* (2006.01)
*F21V 7/04* (2006.01)

(52) U.S. Cl.
USPC ............... 385/146; 385/14; 385/15; 385/19; 385/25; 385/26; 385/115; 385/116; 362/555; 362/551

(58) Field of Classification Search
USPC .................. 385/14–15, 19, 25–26, 115–116, 385/146; 362/555, 551
See application file for complete search history.

(56) References Cited

U.S. PATENT DOCUMENTS 3,455,625 A * 7/1969 Ferris et al. ............... 385/54
5,408,551 A * 4/1995 Maria van Woesik .......... 385/28
7,127,163 B2 * 10/2006 Lee et al. ................... 396/198

* cited by examiner

*Primary Examiner* — Brian Healy
*Assistant Examiner* — Guy Anderson

(57) ABSTRACT

A light distribution assembly includes a housing having a longitudinal length and having one or more light sources mounted to the housing. The light distribution assembly also includes a coupler section having a body extending from the housing along a longitudinal axis between a light entry end and a light exit end. The light entry end has a major axis extending in a first direction and the light exit end has a major axis extending in a second direction, wherein the coupler section is shaped such that the body is rotated about the longitudinal axis of the coupler section so that first direction is approximately perpendicular relative to the second direction. One or more light pipes are attached to the light exit end of the coupler section.

20 Claims, 5 Drawing Sheets

LIGHT DISTRIBUTION ASSEMBLY

CROSS REFERENCE TO RELATED APPLICATIONS

This application claims the benefit of U.S. Provisional Application No. 61/273,621 filed Aug. 6, 2009, titled LIGHT DISTRIBUTION ASSEMBLY, the subject matter of which is herein incorporated by reference in its entirety.

BACKGROUND OF THE INVENTION

The subject matter herein relates generally to light pipes and, more particularly, to an assembly for the distribution of light from one or more light sources to one or more light pipes.

Current lighting systems comprise a light source, such as Light Emitting Diodes (LEDs), and a light pipe to distribute the light in the desired configuration. In some applications, more than one light source and/or more than one light pipe may be provided. For example, two LEDs may be used with two or more light pipes. In some applications, it is desirable to have equal average optical pathways from any of the two LEDs to any light pipe to provide equal light inputs for both light pipes. However, conventional lighting systems using light pipe assemblies have problems collecting light from either one of multiple possible light sources and then distributing the light to two or more separate light pipes along equal average optical pathways. In current assemblies, due to the geometry of the assemblies and/or the wavelength selective absorption of transparent plastic materials, light arrives on target in interlaced chromatic spots.

White light emitting LEDs can be produced either by superposing red, green, and blue light emitted by three semiconductor dies embedded into the RGB LED, or in the case of the standard white LED, color subtraction produced by a phosphorus layer within the semiconductor of a blue LED. However, both the RGB and the standard white LED might present noticeable spatial color variation due to selective wavelength absorption that characterizes all optical media, especially transparent plastic materials. Moreover, the refractive index of a material is dependant of the light wavelength. This applies also to the standard white LED as it is defined by a wave spectrum.

As the LED emission is Lambertian, it will lead to uneven spatial flux distribution and color participation into any cross section of the coupling secondary optics. In order to maintain a relative even spatial distribution both in respect to luminous flux and chromaticity, random light shuffling may be used. The existing methods adopted for color mixing include transmissive optics, reflective optics, or diffusing optics. Diffusing optics are characterized by high degree of light absorption that makes them not suitable for light pipe applications. Using transmissive and reflective optics requires long pathways to achieve a high number of reflections.

A need remains for a cost effective light distribution assembly for distributing light from either one or more light sources (e.g. LEDs) to two or more light pipes while preserving the desired color intensity from the different LED combinations.

BRIEF DESCRIPTION OF THE INVENTION

In one embodiment, a light distribution assembly is provided including a housing having a longitudinal length and having one or more light sources mounted to the housing. The light distribution assembly also includes a coupler section having a body extending from the housing along a longitudinal axis between a light entry end and a light exit end. The light entry end has a major axis extending in a first direction and the light exit end has a major axis extending in a second direction, wherein the coupler section is shaped such that the body is rotated about the longitudinal axis of the coupler section so that first direction is approximately perpendicular relative to the second direction. One or more light pipes are attached to the light exit end of the coupler section.

In another embodiment, a light distribution assembly is provided including a housing having a longitudinal length and having one or more light sources mounted to the housing. A coupler section having a body extends from the housing along a longitudinal axis between a light entry end and a light exit end. Multiple light pipes attached to the light exit end of the coupler section. The body of the coupler section is twisted such that the average light pathway to the light pipes is the same irrespective of which light source is emitting light.

In a further embodiment, a light distribution assembly is provided including a coupler section having a body extending along a longitudinal axis between a light entry end and a light exit end. The light entry end is configured to receive light from one or more light sources. The light entry end has a major axis extending in a first direction. The light exit end is configured to direct light into multiple light pipes. The light exit end has a major axis extending in a second direction. The coupler section is shaped such that the body is rotated about the longitudinal axis of the coupler section so that the first direction is approximately perpendicular relative to the second direction.

DETAILED DESCRIPTION OF THE INVENTION

Figure 1:
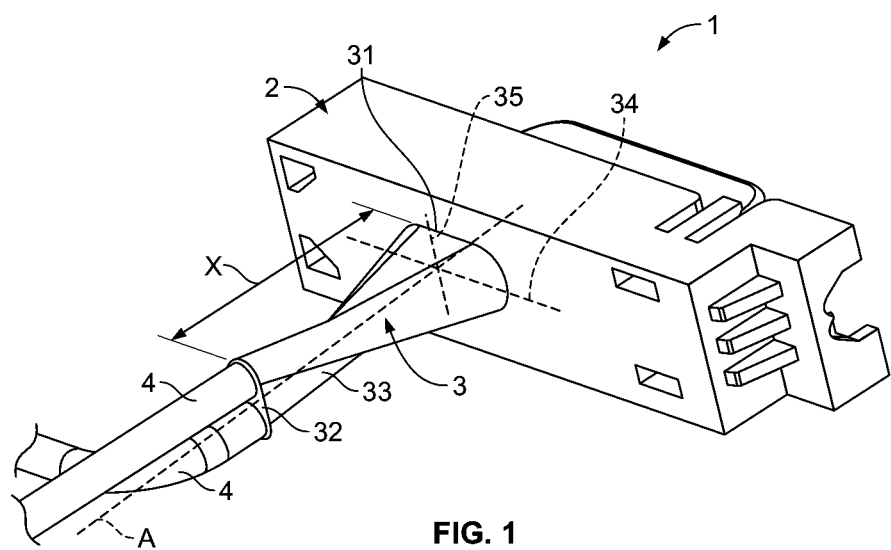
FIG. 1 shows an isometric view of an exemplary embodiment of the light distribution assembly of the present invention.

The subject matter herein describes a geometry for a light distribution assembly that distributes light from one or more light sources, such as light emitting diodes (LEDs) to two or more light pipes. The light distribution assembly may preserve a desired color uniformity from different LED combinations. The light distribution assembly may create equivalent optical paths for different LEDs. The light distribution assembly presents a large number of internal specular reflections per unit of coupler length. The light distribution assembly may decrease the probability of extreme luminous values or large chromatic distances within any given infinitesimal areas at the output of the light distribution assembly to the light pipes. In an exemplary embodiment, the light distribution assembly couples two LEDs, one RGB and one standard white, to two light pipes in such a way that the average light pathway is the same irrespective of which LED is emitting light. The light distribution assembly may present a uniform spatial distribution of the RGB components of the RGB LED for an even chromatic distribution. The light distribution assembly assures a low and controllable chromaticity shift from the standard white LED to the light exit area to the light pipe.

As shown in FIGS. 1-4, an exemplary embodiment of the light distribution assembly 1 comprises a housing 2, a coupler section 3 and one or more light pipes 4. In an exemplary embodiment, the coupler section 3 constitutes a solid lens. The coupler section 3 includes a light entry end 31, a light exit end 32 and a body 33 extending therebetween. The coupler section 3 extends from the housing 2. Optionally, the coupler section 3 may be integrally formed with the housing 2, such as during a common molding process or other forming process. Alternatively, the coupler section 3 may be separate and discrete from the housing 2, and coupled to the housing 2. Light generated in the housing 2 enters the coupler section 3 at the light entry end 31. The light is reflected and mixed within the coupler section 3 and exits the coupler section 3 at the light exit end 32. The light enters the one or more light pipes 4 from the coupler section 3 and is distributed along the light pipes 4.

The housing 2 includes a flange 7 for providing an attachment means to hold or support the light distribution assembly 1 in a particular application. The flange 7 includes a through hole 71 and slot 72 for locating and retaining the light distribution assembly 1. Other types of locating and/or retaining means or features may be used for securing the housing 2 in proper position in alternative embodiments.

Figure 2:
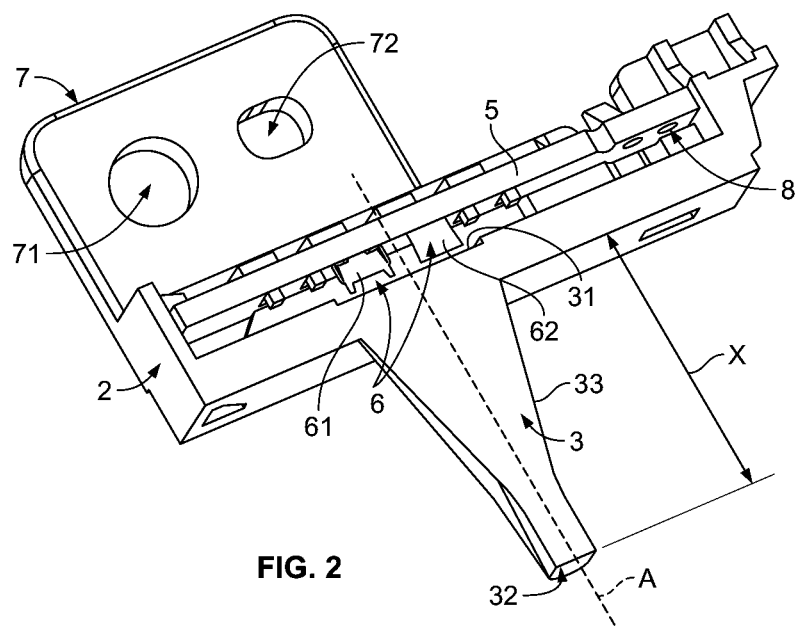
FIG. 2 shows a top isometric view of the assembly of FIG. 1.
Figure 3:
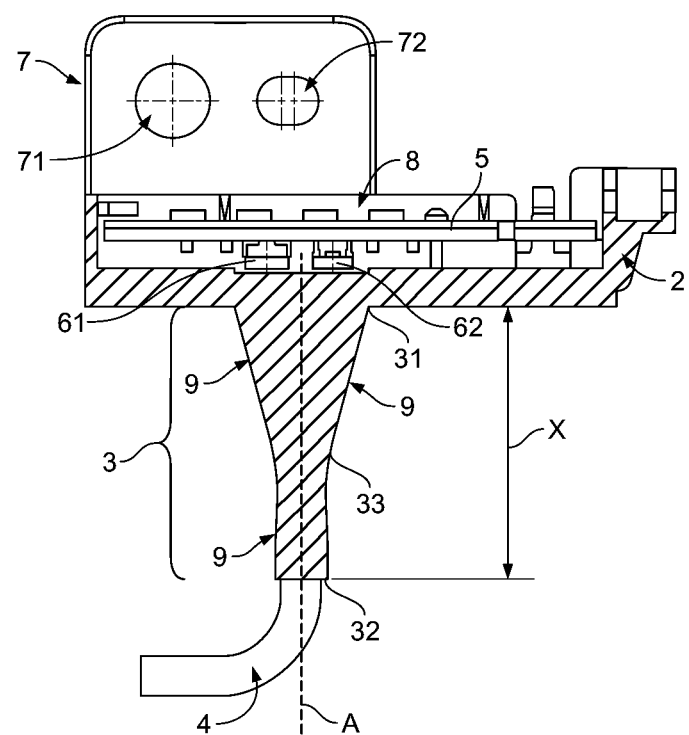
FIG. 3 shows a top section view of the assembly of FIGS. 1 and 2.

As shown in FIGS. 2-3, the housing 2 includes a light engine 8 for generating light. The light engine 8 has a longitudinal length, which may be parallel to the longitudinal length of the housing 2. In an exemplary embodiment, the light engine 8 includes a printed circuit board (PCB) 5 and one or more light sources 6. In an exemplary embodiment, multiple light sources 6 are provided, with the different light sources 6 having different lighting properties or characteristics. The light sources 6 shown in FIG. 2 are two Light Emitting Diodes (LEDs), however other types of light sources may be suitable for use within the light engine 8.

In the exemplary embodiment, the light engine 8 includes a first LED 61 and a second LED 62. The first LED 61 is a Red Green Blue (RGB) LED emitting red, green and blue light. The second LED 61 is a monochromatic LED, such as a white LED emitting white light. As known to those skilled in the art, each light color has an associated dominant wavelength. Accordingly, each color is reflected in the light distribution assembly 1 according to its associated dominant wavelength.

In any particular application or any particular use, each one of, or both, the first LED 61 and the second LED 62 may be operating at any one time. Consequently, the distribution assembly 1 is capable of distributing light from each of the first LED 61 and the second LED 62 individually or a combination of both while preserving the desired color intensity from the different LED combinations. The light distribution assembly 1 collects the light from the first LED 61 and/or the second LED 62 and distributes the light through the coupler section 3 to one or more light pipes 4.

As shown in FIG. 3, the first and second LEDs 61, 62 are mounted side by side along the longitudinal length of the light engine 8 within the housing 2. The LEDs 61, 62 are located adjacent to, and aligned with, the light entry end 31 of the coupler section 3. In an exemplary embodiment, the LEDS 61, 62 are placed asymmetrically with respect to a longitudinal axis A of the coupler section 3. In alternate embodiments having more than two light sources, the light sources 6 may be placed in alternate configurations, such as a linear configuration (align side by side), triangular configuration, or various other suitable arrangements.

The light from the LEDs 61, 62 enters the coupler section 3 at the light entry end 31. The coupler section 3 comprises a plurality of reflective surfaces 9 configured to reflect the light. Optionally, the reflective surfaces 9 may have a mirror finish such as SPI A1. The reflective surfaces 9 may be smooth and rounded, or alternatively, may be flat and angular. The body 33 of the coupler section 3 is shaped such that the average light pathway is the same irrespective of which LED 61 and/or 62 is emitting light. The body 33 of the coupler section 3 is shaped such that the light exiting from the coupler section 3 at the light exit end 32 presents a uniform spatial distribution of the RGB components of the RGB LED for an even chromatic distribution. The shape of the body 33 provides a large amount of internal reflections along the length, and thus a high degree of light shuffling for a given length of the body 33. The shape of the body 33 provides a larger number of internal reflections and light shuffling than light pipes having a generally straight pathway, which allows the body 33 to have a shorter length.

Figure 4:
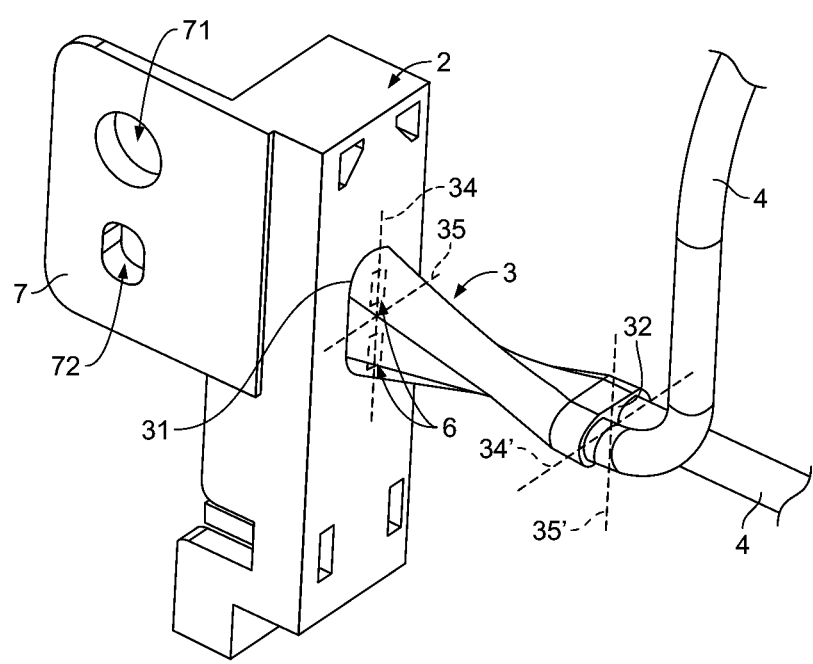
FIG. 4 shows a side isometric view of the assembly of FIG. 1, and FIGS. 5a-5c are front isometric, top and side views showing tracing analysis of light reflection within the light distribution assembly.

As shown in FIGS. 1, 2 and 4, the light entry end 31 of the coupler section 3 is adjacent to the housing 2 and the light exit end 32 is adjacent to the light pipes 4. The body 33 extends therebetween along the longitudinal axis A. The body 33 extends a length X along the longitudinal axis A. Optionally, the coupler section 3 may be oriented such that the body 33 extends with the longitudinal axis A oriented perpendicular to the longitudinal length of the housing 2.

In an exemplary embodiment, the body 33 has a generally oval cross-section having a major axis 34 and a minor axis 35. At the light entry end 31, the major axis 34 extends in a first direction parallel to the longitudinal length of the housing 2 and light engine 8. At the light exit end 32, the major axis 34' (shown in FIG. 4) extends in a second direction perpendicular to the longitudinal length of the housing 2 and light engine 8. The major axis 34 may be oriented differently at the light entry and exit ends 31, 32 with respect to each other and/or the housing 2 in alternative embodiments. In alternate embodiments having more than two light sources and/or more than two light pipes, the cross-section shape of the coupler section 3 may be a different shape to accommodate the light entry and the light exit to the light pipes 4.

The body 33 of the coupler section 3 is rotated or twisted around the axis A along the longitudinal axis A. Optionally, the body 33 may have a constant twisting angle along the length X. Alternatively, the twisting angle may vary along the length X. For example, the body 33 may be twisted more (e.g. have a greater twisting angle per unit length) near the center of the body 33 or the body may be twisted more proximate to the light entry end 31 and/or the light exit end 32. Optionally, the body 33 may be twisted at least 90° along the length X. For example, in the illustrated embodiment, the body 33 is twisted so that the direction of the major axis 34' at the light exit end 32 is rotated 90° relative to the direction of the major axis 34 at the light entry end 31. The twisting angle per unit length as well as the length X may be selected to control the amount of internal reflection. For example, having a larger twisting angle per unit length may increase the amount of reflection. Having a longer length X may also increase the amount of reflection. The optical pathways are defined by the amount of reflection, and the shape of the coupler section 3 may be selected to provide a particular amount or characteristic of light output to the light pipes 4. For example, the twisting of the coupler section 3 adds to the amount of reflection.

In an exemplary embodiment, the body 33 maintains the oval cross-sectional shape along the length X, with the angular orientation of the oval being different along the length X. Optionally, the size of the oval at the light entry end 31 may be different than the size of the oval at the light exit end 32. For example, the oval may be larger at the light entry end 31 than at the light exit end 32. The size of the light entry end 31 may depend on the number and/or positioning of light sources 6. The size of the light exit end 32 may depend on the number and/or positioning of the light pipes 4. Optionally, the shape of the body 33 may transform along the length, such as from an oval shape to a triangular shape, a cruciform shape or another shape. For example, when having a linear array of light sources 6, the oval shape may be used at the light entry end 31. When having three light pipes 4, the light exit end 32 may have a triangular shape. When having four light pipes 4, the light exit end 32 may have a cruciform shape. Other arrangements and shapes are possible in alternative embodiments depending on the particular application. Additionally, other shapes other than an oval shape are possible at the light entry end 31, including a triangular shape, a cruciform shape, or other shapes.

In an exemplary embodiment, the LEDs 61, 62 are asymmetrically placed with respect to the longitudinal axis A of the coupler section 3. The LEDs 61, 62 are not aligned along the longitudinal axis A, but rather are offset from the longitudinal axis A. Light is not directed straight down in the longitudinal axis A, but rather is directed toward the reflective surfaces 9. The light distribution assembly 1 provides a large number of internal specular reflections at the reflective surfaces 9 per unit of coupler section length. The light distribution assembly 1 decreases the probability of extreme luminous values or large chromatic distances within any given infinitesimal areas at the output of the coupler section 3 at the light exit end 32. The large number of internal reflections creates a uniform distribution of color along any cross-section of the body 33 along the length. The coupler section 3 distributes light from any of the asymmetrically placed LEDs 61, 62 to any of the light pipes 4. Optionally, the light pipes 4 may be positioned such that centerlines of the light pipes 4 are offset from the longitudinal axis A. The shape of the body 33 permits the average light pathway from any LED 61, 62 to any light pipe 4 to be the same regardless of which LED 61, 62 is emitting light. The optical pathways from any LED 61, 62 to any light pipe 4 is equal. The equal optical pathways provide equal light inputs for both light pipes 4 from the particular LED 61, 62 emitting light. The same amount of light is provided to each light pipe 4. In an exemplary embodiment, only one LED 61, 62 is active at any time. Alternatively, both LEDs 61, 62 are active at the same time. Other alternative embodiments may include more than two LEDs or other types of light sources 6.

Figure 5A:
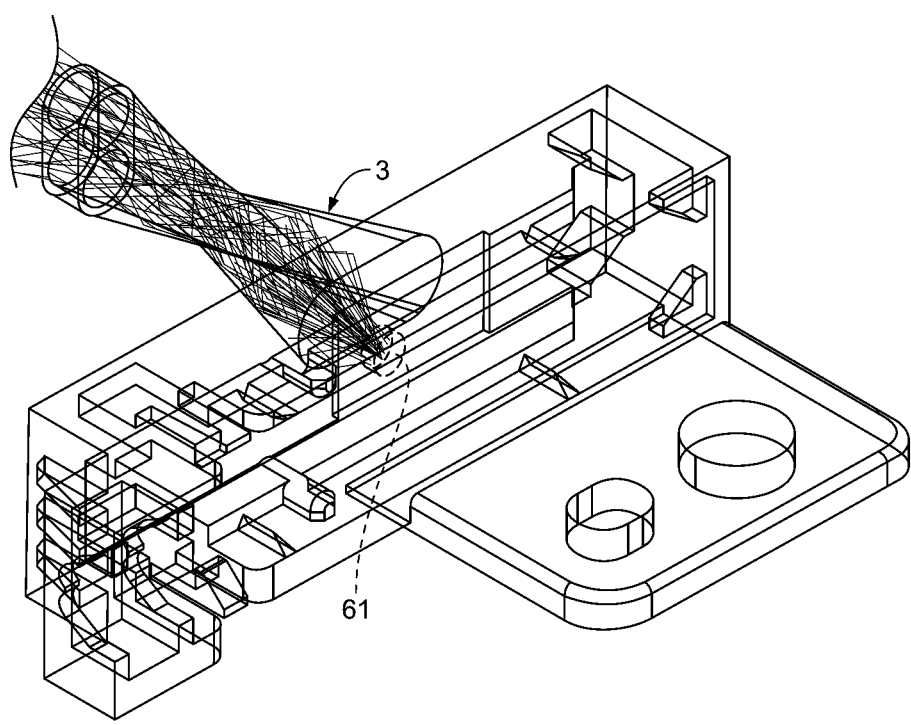
Figure 5B:
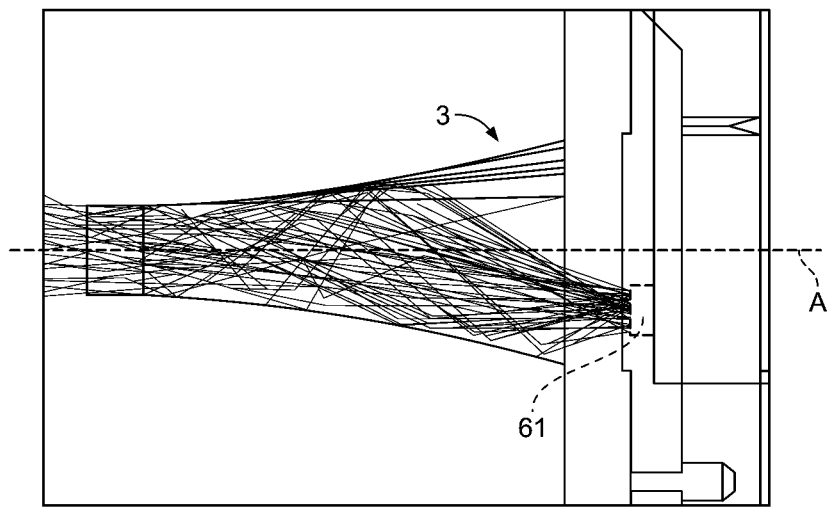
Figure 5C:
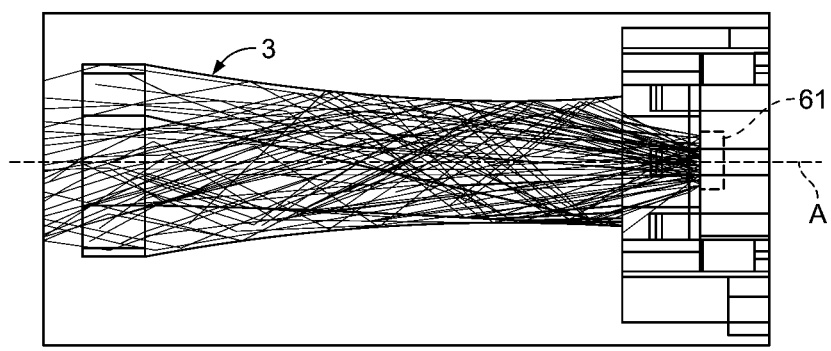

As shown in FIGS. 5a-5c, mixing of the red, green and blue color patterns from the RGB LED 61 is done with the coupler section 3. The shape and/or geometry of the coupler section 3 allows a large number of internal specular reflections per unit of length along the longitudinal axis A. The average light pathway from the RGB LED 61 to each of the light pipes 4 is the same, so the spectrum of colors at the light pipes 4 are in the same phase, which means that no, or reduced, color differentiation is observable in the light emitted from the light pipes.

As shown in FIGS. 1 and 4, the light pipes 4 are generally tubular having a circular cross-section. Other types of light pipe configurations may be used in alternative embodiments. The light pipes 4 are attached to the light exit end 32 of the coupler section 3 and are oriented axially with respect to the direction of the incoming light. Optionally, the light pipes 4 may be molded from a clear plastic such as high impact acrylic, however other suitable materials may be used in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A light distribution assembly comprising:
a housing having a longitudinal length and having one or more light sources mounted to the housing;
a coupler section having a body extending from the housing along a longitudinal axis between a light entry end and a light exit end, the light entry end has a major axis extending in a first direction and the light exit end has a major axis extending in a second direction, wherein the coupler section is shaped such that the body is rotated about the longitudinal axis of the coupler section so that first direction is approximately perpendicular relative to the second direction, wherein the body has a generally oval cross-section along the length, the major axis being twisted between the first direction and the second direction along the length; and
one or more light pipes attached to the light exit end of the coupler section.

2. The light distribution assembly of claim 1, wherein the body of the coupler section is twisted at least 90° along the longitudinal axis.

3. The light distribution assembly of claim 1, wherein the major axis of the light entry end is substantially parallel to the longitudinal length of the housing and the major axis of the light exit end is substantially perpendicular to the longitudinal length of the housing.

4. The light distribution assembly of claim 1, wherein the body of the coupler section is twisted such that the average light pathway to the one or more light pipes is the same irrespective of which light source is emitting light.

5. The light distribution assembly of claim 1, wherein the coupler section extends from the housing such that the light sources are offset from the longitudinal axis.

6. The light distribution assembly of claim 1, wherein the one or more light pipes are attached to the light exit end such that centerlines of the one or more light pipes are offset from the longitudinal axis.

7. The light distribution assembly of claim 1, wherein the one or more light sources are placed asymmetrically with respect to the longitudinal axis.

8. The light distribution assembly of claim 1, wherein the one or more light sources comprise a first LED being a RGB LED and a second LED being a white LED configured to operate at the same time or at different times.

9. The light distribution assembly of claim 1, wherein the one or more light sources comprise one or more RGB LEDs, the light exiting from the coupler section at the light exit end from the RGB LED presents a uniform spatial distribution of the RGB components of the RGB LED for an even chromatic distribution.

10. A light distribution assembly comprising:
a housing having a longitudinal length and having one or more light sources mounted to the housing;
a coupler section having a body extending from the housing along a longitudinal axis between a light entry end and a light exit end; and
multiple light pipes attached to the light exit end of the coupler section,
wherein the body of the coupler section is twisted such that the average light pathway to the light pipes is the same irrespective of which light source is emitting light and wherein the body is shaped to permit equal average light pathways from any of the one or more light sources to any of the multiple light pipes.

11. The light distribution assembly of claim 10, wherein body of the coupler section is twisted at least 90° along the longitudinal axis.

12. The light distribution assembly of claim 10, wherein the body has a generally oval cross-section along the length having a major axis and a minor axis perpendicular to the major axis, the body being twisted along the longitudinal axis such that the major axis is oriented in a first direction at the light entry end and in a second direction at the light exit end, the second direction being twisted at least 90° with respect to the first direction.

13. The light distribution assembly of claim 10, wherein the multiple light pipes are attached to the light exit end such that centerlines of the light pipes are offset from the longitudinal axis.

14. The light distribution assembly of claim 10, wherein the one or more light sources are placed asymmetrically with respect to the longitudinal axis.

15. A light distribution assembly comprising:
a coupler section having a body extending along a longitudinal axis between a light entry end and a light exit end,
the light entry end being configured to receive light from one or more light sources, the light entry end being non-circular and elongated having a major axis extending in a first direction,
the light exit end being configured to direct light into multiple light pipes, the light exit end being non-circular and elongated having a major axis extending in a second direction,
wherein the coupler section is a twisted solid lens shaped such that the body is rotated about the longitudinal axis of the coupler section so that the first direction is approximately perpendicular relative to the second direction.

16. The light distribution assembly of claim 15, wherein body of the coupler section is twisted at least 90° along the longitudinal axis.

17. The light distribution assembly of claim 15, wherein the body is shaped to permit equal average light pathways from any of the one or more light sources to any of the multiple light pipes.

18. The light distribution assembly of claim 15, wherein the body has a generally oval cross-section defined along the major axis, the major axis being twisted between the first direction and the second direction along the longitudinal axis.

19. The light distribution assembly of claim 15, wherein the light entry end is positioned adjacent a plurality of LEDs and the light exit end is positioned adjacent a plurality of light pipes, the twisted solid lens directing light from the LEDs to the light pipes.

20. The light distribution assembly of claim 15, wherein the light entry end and the light exit end are oriented along parallel planes.

* * * * *